INVENTOR
George T. Meyers.

April 14, 1942.   G. T. MEYERS   2,280,036
METHOD OF FEEDING MOLTEN GLASS
Filed Oct. 16, 1939   2 Sheets-Sheet 2

INVENTOR
George T. Meyers.
BY
ATTORNEYS

Patented Apr. 14, 1942

2,280,036

UNITED STATES PATENT OFFICE 2,280,036

METHOD OF FEEDING MOLTEN GLASS

George T. Meyers, Parkersburg, W. Va., assignor to The Meyers Company, Parkersburg, W. Va., a corporation of West Virginia Application October 16, 1939, Serial No. 299,633

2 Claims. (Cl. 49—77)

My invention relates to a method of feeding molten glass. It has to do particularly with a method of feeding molten glass from the forehearth of a glass melting furnace to a mold or the like for shaping into the desired article. It relates, more specifically, to that type of feeder wherein preformed charges of a predetermined size and weight are fed to the molds.

There are two types of glass feeders, for feeding charges of predetermined shape and size, which are in common use today. Both types include a spout which is connected to the glass furnace and which has an orifice adjacent its outer end through which the glass is extruded in the form of charges of predetermined size and weight. In both of these types of feeders, controlling means is provided for controlling the flow of the glass through the orifice. One type employs a reciprocating needle or plunger which is disposed above the orifice and which alternately aids in forcing the glass downwardly through the orifice and then draws it back upwardly into the orifice after a charge is severed therefrom. The other type of feeder employs a tube which is disposed above the orifice and which is immersed in the glass, means being provided for alternately applying pressure within the tube to aid in forcing the glass from the orifice and applying suction to the tube to withdraw the glass upwardly into the orifice after a charge is severed therefrom. With the plunger type feeder, it is necessary to provide complicated mechanism for reciprocating the plunger and for timing the reciprocations with the operation of the shear structure and the forming machine. With the other type of feeder, it is necessary to provide complicated mechanism for alternately creating vacuum and pressure in the tube and for timing these operations with the shear structure and the forming machine.

Furthermore, the plunger type of feeder has other disadvantages. The plunger is usually made of refractory material and when it reciprocates or revolves, or both, above the orifice it wears off and small particles of this refractory material go into the glass and are present in the finished product. It is also a characteristic of this type of feeder to produce mold charges having blisters, cords and streaks. The plunger acting on the glass stretches, pulls and separates the fibers or molecules of the glass which produces certain strains and stresses in the finished articles. Attempts have been made to overcome these defects by providing a revolving tube of refractory material around the plunger. However, it has been found that this tube wears off like the plunger. It has been further found that by the reciprocating movement of the plunger and the revolving and churning movement of the refractory tube around the plunger, the damaging particles of refractory are widely distributed throughout the finished product.

The other type of feeder embodying the tube, in which pressure and vacuum is alternately applied, also has other disadvantages. The constant pulsation of the vacuum and pressure forces have a tendency to loosen small particles of the refractory material of the tube. Consequently, the same defects are present, in this respect, with this type of feeder as with the plunger type.

One of the objects of my invention is to provide a very simple but effective method for feeding molten glass from a furnace to a mold.

Another object of my invention is to provide a very simple and effective method for controlling the flow of the glass through the discharge orifice of the glass feeding spout.

Another object of my invention is to provide a method of the type indicated in the preceding paragraphs which is of such a nature that very simple and inexpensive apparatus is required to perform it.

Another object of my invention is to provide a method of controlling the flow of the glass through the discharge orifice of the spout without the use of a reciprocating plunger or a tube in which vacuum and pressure is alternately created and, consequently, without the use of complicated operating and timing mechanism.

Another object of my invention is to provide method of such a nature that the glass will be fed from the melting furnace to the mold or forming machine in such a manner that the glass gob and finished product will be free of small refractory particles, blisters, cords and streaks.

Another object of my invention is to provide method of feeding molten glass in the form of preformed charges in such a manner that the glass fibers or molecules will not be stretched, pulled, separated or acted upon in any mechanical manner before the glass leaves the orifice, thereby eliminating certain strains and stresses from the finished articles.

Another object of my invention is to provide a method of feeding molten glass which is practical, economical, fast, simple in operation, and very effective to produce high quality charges resulting in a finished product of a high quality.

According to my method I provide a glass feeding spout which, in its general structure, is similar to those now in use and which is suitably connected to the glass melting furnace. In this spout a predetermined level of molten glass is maintained. The spout is provided with a discharge orifice at its outer end of a predetermined size. The head pressure of the glass in the spout extrudes the glass through this orifice in the form of a column of a predetermined cross-section and charges of predetermined size are sheared from this column by shears disposed below the orifice, which are operated at suitable intervals. For controlling the flow of the glass through the orifice, I provide a hollow tube or cylinder directly above the orifice. This tube has its lower end open and this end is always immersed in the glass in the spout. The upper end of this tube or cylinder is normally closed but it is provided with a pasage through which the air from the tube or cylinder may be substantially evacuated in any suitable manner.

In using this feeder, the tube or cylinder is adjusted in the spout so that its lower open end is spaced a suitable predetermined distance above the spout orifice. This distance depends upon the size and weight of the charges to be formed. The air is substantially exhausted from the upper end of the tube. However, it is to be understood that it is merely necessary to exhaust this air from the tube when operations are started and it is not necessary to continue the application of vacuum thereto. In other words, it is merely necessary to create the vacuum in the tube and, thereafter, there will be a continuous vacuum within the tube.

Creating a vacuum in the upper end of the tube causes the glass to be drawn upwardly within the tube to a higher level than the glass in the spout. The glass in the spout will be forced around the lower end of the tube and downwardly through the discharge orifice. The vacuum in the tube will always exert a lifting force on the glass within the orifice. However, the weight of the glass adjacent the orifice will gradually overcome this and the glass will gradually be extruded through the orifice by the head pressure of the glass in the spout, and will form an elongated column below the orifice. This will also tend to pull the glass downwardly from the tube and will, consequently, lower the level of the glass within the tube. However, as soon as a charge or gob is sheared from the depending column, the weight of the glass directly below the tube and in the orifice is greatly reduced. Consequently, the vacuum in the upper end of the tube will then be sufficiently strong to lift the lesser weight of glass and draw it back up into the orifice where the severed end will be reheated. Simultaneously the level of the glass in the tube will rise to its original point. Thereafter, the head pressure of the glass in the spout will again start to extrude the column from the orifice and the cycle of operations will be repeated.

In the accompanying drawings I have illustrated how my method is performed and apparatus which may be used in performing it. In these drawings, similar characters of reference designate corresponding parts and:

Figure 1:
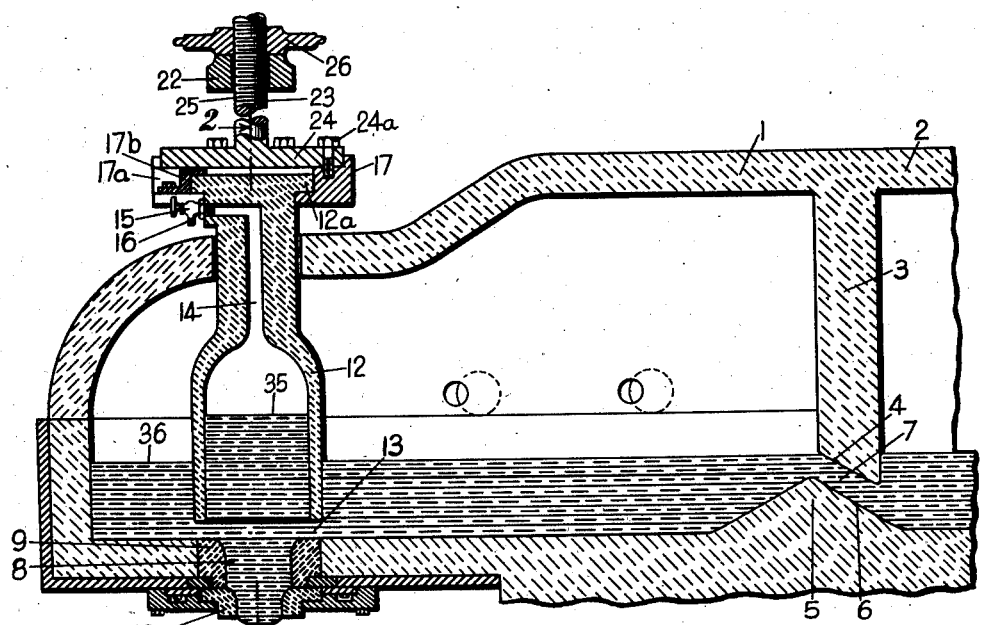
Figure 1 is a longitudinal sectional view taken along line 1—1 of Figure 2 through a glass feeding spout having controlling means associated with the discharge orifice in accordance with my invention.

With reference to the drawings, I illustrate a glass feeder which may be used in performing my method as comprising a spout 1 which, in its general structure, is substantially the same as the glass feeding spouts now commonly in use. The spout or forehearth 1 is connected to the glass melting furnace 2. A depending skimmer block 3 is provided in the opening connecting the spout 1 and the furnace 2. However, this skimmer block is different than those usually employed in structures of this type. It is provided with a rearwardly and downwardly beveled lower edge 4. On the floor of the spout, a protuberance 5 is formed which has a rearwardly and downwardly inclined surface 6. This surface 6 is spaced from the surface 4 and is inclined to the same extent so that it is parallel therewith. Thus, a passageway 7 is formed which is inclined downwardly and rearwardly. For the glass from the melting furnace 2 to reach the spout 1, it is necessary for it to flow upwardly through the passageway 7 and over the protuberance 5. This ensures that the depending portion of the skimmer block 3, which extends below the surface of the glass will skim off the scum which usually forms on the surface of the glass and will prevent it from reaching the spout.

The spout 1 has a glass discharge orifice 8 in the bottom thereof adjacent the forward end thereof. A removable bushing 9 is disposed in this orifice. A second removable bushing 10 is disposed directly below the bushing 9 and may be removed and replaced with a bushing of different size depending upon the size of the glass charge or gob desired. Shears 11 of any suitable structure are provided directly below the discharge orifice. These shears may be operated by any well known mechanism at timed intervals, which are adjustable, to sheer charges from the column being extruded through the orifice.

In this type of feeder, a predetermined level of glass is always maintained in the spout 1. Consequently, the head pressure of the glass in the spout will tend to extrude the glass through the orifice in the form of a column and the shears operate to sever the glass charges therefrom before a stream of glass is produced. Thus, charges of a predetermined size and shape are produced. The temperature of the glass is regulated to maintain the glass at the proper viscosity and to control, to a certain extent, the extrusion of the glass from the orifice. However, it is desirable to provide additional means for controlling the extrusion of the glass through the orifice.

Figure 2:
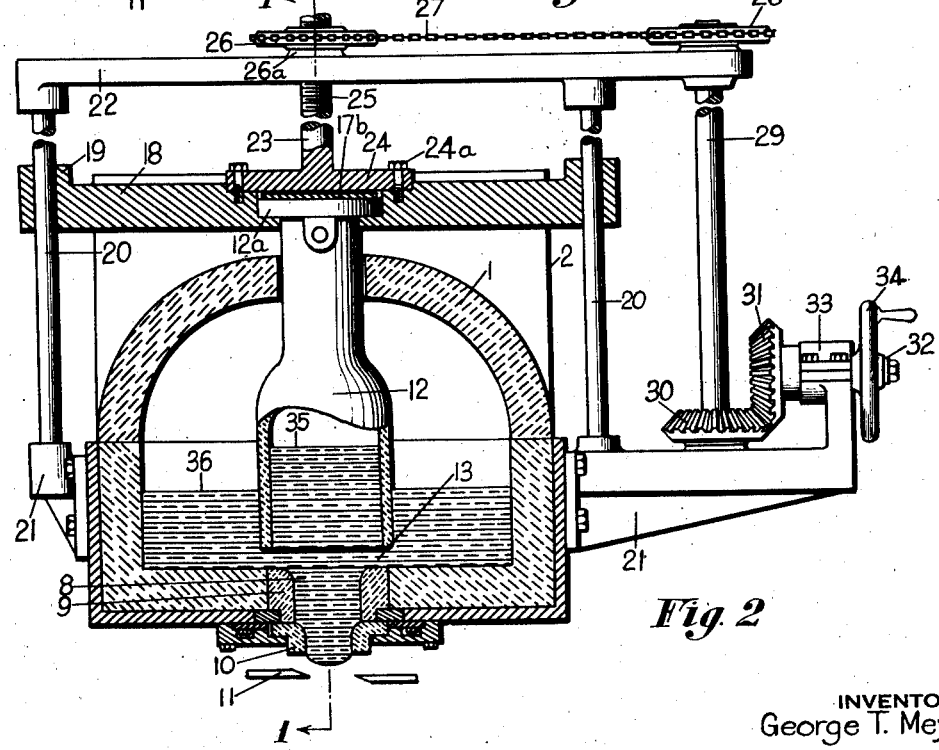
Figure 2 is a transverse sectional view taken through the spout along line 2—2 of Figure 1, a part of the control tube being shown broken away.

For this purpose I provide a tube 12 which may be of refractory material. The lower end of this tube, during operation of the feeder, is always immersed in the molten glass in the spout, as indicated in Figures 1 and 2. The lower end of the tube is always spaced from the top of the bushing 9 so that an annular space 13 is formed, through which the glass will flow from all parts of the spout to the discharge orifice 8. The upper end of the tube 12 is closed with the exception of a small passageway 14. This passageway 14 may be under the control of a manually operable valve 15. However, this valve may be an automatic one-way valve, if desired, for permitting the air to be exhausted from the tube 12 out through the passageway 14.

When it is desired to use this feeder, it is necessary to substantially exhaust the air from the upper end of the tube 12, after its lower end has been immersed in the glass. This may be done by connecting a vacuum pump to a fitting 16 on the valve 15. In other instances where the shape of the tube 12 and the extent of the vertical adjustment thereof permit, the air may be eliminated from the upper end of the tube, merely by adjusting the tube downwardly in the glass in the spout until the chamber in the tube is completely filled with glass. This will force the air upwardly through the passageway 14 and out past the open valve 15. Then if the valve is closed and the tube 12 is raised, there will be a vacuum in the upper end thereof due to the fact that the air has been displaced by the glass. The vacuum in the upper end of the tube may be produced in various ways and my invention is not limited to any particular manner of producing it. It is merely necessary to produce the vacuum in the upper end of the tube, in some manner, when the operation of the feeder is started and, thereafter, the vacuum in the upper end of the tube will be continuously present.

The tube 12 is supported in such a manner that it may be vertically adjusted. The upper end of the tube 12 is removably secured to a member 17 formed on a cross-arm 18. The tube has a flange 12a on its upper end which slides into channels 17a formed in member 17. A removable clip 17b normally holds the flange 12a in the member 17. The cross-arm 18 has sleeves 19 formed in its outer ends and through which posts 20 extend. These posts 20 have their lower ends mounted on suitable supports 21, disposed at each side of the spout. The upper ends of these posts are joined together by a stationary cross-arm 22. Substantially midway between its ends, this member 22 has an opening through which a vertically disposed shaft 23 is passed. The shaft is free to move vertically through this opening. The lower end of the shaft has a flange 24 formed thereon which is bolted by bolts 24a to member 17 on the cross arm 18. The upper portion of the shaft is threaded, as indicated at 25, and this threaded portion passes through a threaded opening in a sprocket 26. The sprocket 26 rests on a boss 26a which is formed on the upper surface of the member 22.

It will be apparent that when the sprocket 26 is rotated, the shaft 23 will be moved vertically and, consequently, the member 12 will be adjusted vertically. The sprocket 26 is connected by a sprocket chain 27 to a second sprocket 28, keyed on the upper end of a vertically disposed shaft 29. This shaft 29 is rotatably mounted at its upper end in an extension of the member 22 and at its lower end it is rotatably carried by one of the supports 21. The lower end of the shaft 29 has a bevel gear 30 keyed thereon which meshes with a bevel gear 31. This bevel gear 31 is keyed on a horizontal shaft 32 which is rotatably carried in a bearing 33 secured to the support 21. The outer end of the shaft 32 has a handwheel 34 keyed thereon. It will be apparent that rotation of this handwheel will produce rotation of shaft 29, sprockets 28 and 26 and vertical movement of shaft 23 and member 12. Thus, the member 12 may be easily and quickly adjusted to any desired vertical position relative to the discharge orifice of the spout.

Figure 3:
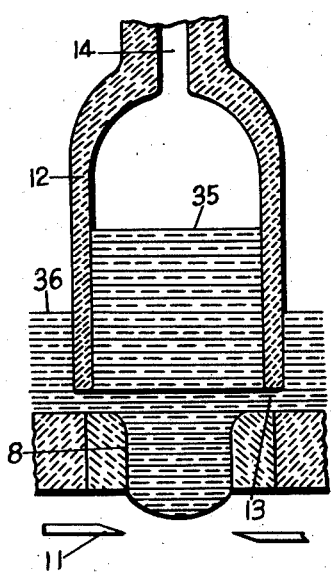
Figure 3 is a more or less diagrammatic view showing the operation of the feeder when the glass just starts to extrude from the spout orifice.
Figure 4:
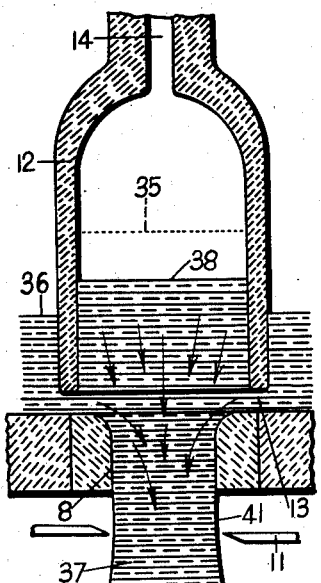
Figure 4 is a similar view showing the condition of the glass just prior to the time a charge is sheared therefrom.
Figure 5:
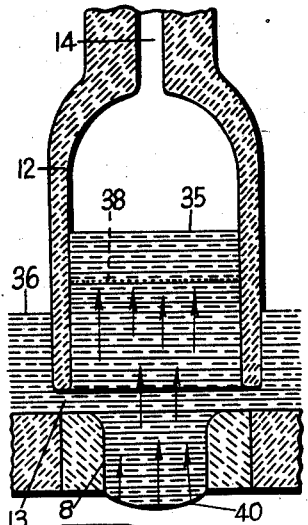
Figure 5 is a similar view showing the condition of the glass after a charge is sheared therefrom.
Figure 6:
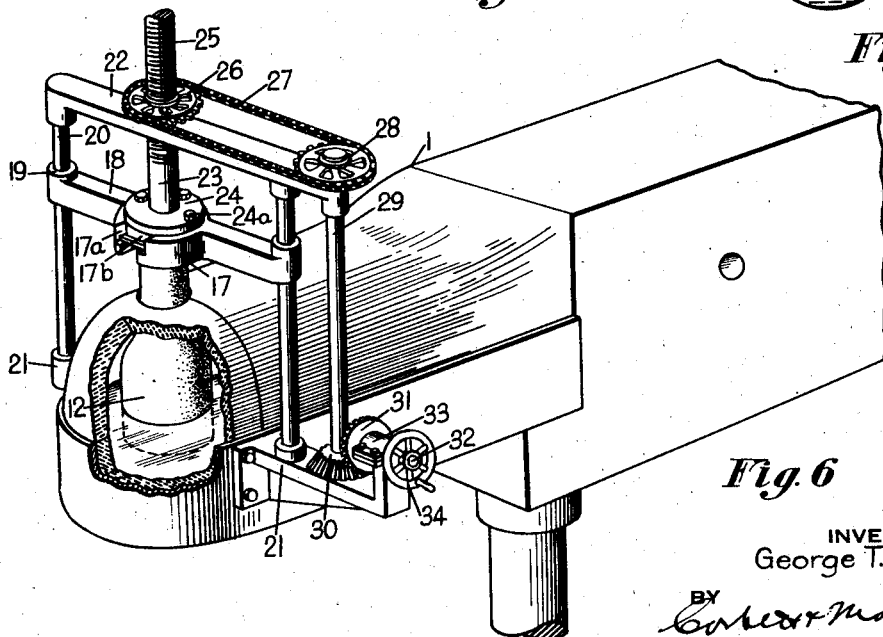
Figure 6 is a perspective view, partly broken away, of my glass feeder.

In using this feeder, I first immerse the lower end of the tube 12 in the glass in the spout, which is at a preselected constant level. I then create a vacuum in the upper end of the tube, as previously described. This vacuum will be maintained as long as the passageway 14 is closed and as long as the lower end of the tube remains immersed in the glass. The tube is then adjusted vertically to the proper extent so that its lower edge is spaced a predetermined distance from the top of the bushing 9. This produces the annular space 13 of a predetermined size so that a predetermined flow of glass to and through the orifice 8 will be obtained. As previously indicated, the lower end of the tube is of greater cross-sectional area than the cross-sectional area of the orifice 8 so that it will overlap the edges of the orifice. With the tube properly adjusted, the feeder will function as follows:

Creating the vacuum in the upper end of the tube 12 causes the glass to be drawn upwardly within the tube to a level, indicated by the numeral 35 (Figure 3) which is higher than the level of the glass in the spout, indicated by the numeral 36. The glass in the spout will be forced through the annular space 13, around the lower end of the tube 12 and downwardly through the discharge orifice 8 by the head pressure of the glass in the spout. The vacuum in the upper end of the tube 12 will always exert a lifting force on the viscous glass within the orifice 8 and directly below the lower end of the tube 12. However, as indicated in Figure 4, the weight of the viscous glass in the orifice and adjacent the lower end of the tube will gradually overcome this vacuum force and the glass will gradually be extruded through the orifice 8 by the head pressure of the glass in the spout and will form an elongated column 37 below the orifice. This will also tend to gradually pull the viscous glass downwardly from the tube 12 and will, consequently, gradually lower the level of the glass within the tube to the point indicated by the number 38 in Figure 4. However, as soon as a charge or gob 39 is sheared from the depending column, as indicated in Figure 5, the weight of the viscous glass directly below the tube 12 and the connected portion in the orifice 8 is greatly reduced. Consequently, as indicated in Figure 5, the vacuum in the upper end of the tube 12 will then be sufficiently strong to lift the lesser weight of viscous glass and draw the glass back up into the tube to its original level, indicated by the number 35 in Figure 5. This will simultaneously draw the glass back up into the orifice 8 so that its severed end 40 will be drawn back up into the orifice and will be reheated. Thereafter, the head pressure of the glass in the spout will again start to extrude the column 37 from the orifice 8 and the cycle of operations will be repeated. With this feeder the glass column 37 has a tendency to neck in at the point of severance, as indicated by the numeral 41 in Figure 4. This will facilitate the severing of the gob.

The shears 11 will be operated at regular intervals. If it is desired to change the size of the gobs or charges severed by the shears, it is merely necessary to adjust the tube 12 vertically. If the tube is adjusted upwardly, the size of the charges will be increased due to the increased flow of glass into the orifice 8 and due to the fact that the effectiveness of the vacuum is decreased because the lower end of the tube is moved away from the discharge orifice. However, if the tube is adjusted downwardly, the size of the charges will be decreased due to the decreased flow of glass into the orifice 8 and due to the fact that the effectiveness of the vacuum is increased because the lower end of the tube is moved closer to the discharge orifice.

It will be apparent from the above description, that I have provided a very simple and effective method for controlling the flow of the glass through the discharge orifice of the glass feeding spout. Very simple and inexpensive apparatus is all that is required to perform my method. The flow of the glass through the orifice is controlled without the use of a reciprocating plunger or a tube in which vacuum and pressure is alternately created and, consequently, without the use of complicated operating and timing mechanism. The glass is fed from the spout in such a manner that the molten charges and the finished product will be free of small refractory particles, blisters, cords and streaks. The glass fibers or molecules will not be stretched, pulled, separated or acted upon in any mechanical manner before the glass leaves the orifice, thereby eliminating certain strains and stresses from the finished articles. My method and apparatus is practical, economical, fast, simple in operation and very effective to produce high quality molten charges resulting in a finished product of a high quality.

Various other objects and advantages will be apparent from the preceding description, the drawings and the following claims.

Having thus described my invention, what I claim is:

1. The method of feeding molten glass from a melting furnace to a mold or the like which comprises causing the glass to flow from the furnace into a glass feeding spout having a downwardly opening discharge orifice, maintaining a constant level of glass within the spout to cause the glass to be extruded through said orifice, controlling the flow of glass through said orifice by providing a hollow member with its open lower end immersed in the glass directly above said orifice at a preselected distance therefrom, creating and maintaining a continuous vacuum force in said hollow member which will act on the glass within and adjacent the orifice but which will be insufficient to prevent the head pressure of the glass within the spout from extruding the glass through the orifice in the form of a depending column, the said head pressure and the said vacuum force being the only forces controlling the extrusion of the glass through said orifice, shearing the charges from said depending column of glass at intervals and thereby permitting the vacuum force to draw the glass back up into the orifice, and adjusting said hollow member vertically towards or away from said orifice to vary the sizes of the charges produced.

2. The method of feeding molten glass from a melting furnace to a mold or the like which comprises causing the glass to flow from the furnace into a glass feeding spout having a downwardly opening discharge orifice, maintaining a substantially constant level of glass in the spout to cause the glass to be extruded through said orifice, controlling the flow of glass through said orifice by providing a hollow member with its open lower ends immersed in the glass directly above said orifice and communicating with the main body of molten glass in the spout by a submerged passage, evacuating said hollow member so that the vacuum force produced in originally evacuating said hollow member will act on the glass within and adjacent the orifice but will be insufficient to prevent the head pressure of the glass within the spout from extruding the glass through the orifice in the form of a depending column, the said head pressure and the said vacuum force originally produced by evacuating said hollow member being the only forces controlling the extrusion of the glass through said orifice, and shearing the charges from said depending column of glass at intervals and thereby permitting the vacuum force to draw the glass back up into the orifice.

GEORGE T. MEYERS.